United States Patent [19]

Albarda et al.

[11] Patent Number: 5,065,978
[45] Date of Patent: Nov. 19, 1991

[54] VALVE ARRANGEMENT OF MICROSTRUCTURED COMPONENTS

[75] Inventors: Scato Albarda, Gross Schenkenberg; Werner Thoren, Lubeck; Stefan Kahning, Steinburg; Peter Vehrens, Sulfeld, all of Fed. Rep. of Germany

[73] Assignee: Dragerwerk Aktiengesellschaft, Lubeck, Fed. Rep. of Germany

[21] Appl. No.: 584,762

[22] Filed: Sep. 19, 1990

Related U.S. Application Data

[62] Division of Ser. No. 334,919, Apr. 17, 1989.

[51] Int. Cl.⁵ .................. F16K 31/02; F16K 31/08; F16K 7/12
[52] U.S. Cl. ................... 251/129.06; 251/65; 251/129.17; 251/331; 251/368
[58] Field of Search ............ 251/129.17, 129.06, 251/331, 129.01, 65, 368

[56] References Cited

U.S. PATENT DOCUMENTS 4,826,131  5/1989  Mikkor ............. 251/129.17

Primary Examiner—Arnold Rosenthal
Attorney, Agent, or Firm—McGlew & Tuttle

[57] ABSTRACT

A valve arrangement from microstructured components worked out of a basic body, for the control of fluids, include an actuation element which is movable relative to a flow path distributor and opens or closes fluid paths depending on its position. A transition from one position into the other is effected by adding an actuating drive connected to an electrical power source. The actuation element is held in its switch position. For a high fluid flow, a large force can be applied to the actuation element. The actuating drive works according to an operating principle aimed at covering the longest distance possible. A holding device is provided, which works according to an operating principle working independent of the first operating principle and provides the generation of the greatest cohesion possible.

3 Claims, 3 Drawing Sheets

VALVE ARRANGEMENT OF MICROSTRUCTURED COMPONENTS

This is a divisional application of application Ser. No. 334,919 filed Apr. 17, 1989.

FIELD AND BACKGROUND OF THE INVENTION

Microstructured valves are described in EP-A1 208 386. In the known valve arrangement a flow path distributor in the shape of an essentially plane silicium disc has appropriate elevations and fluid paths with respective openings; which can be opened or closed by means of a movable membrane used as actuation element. The membrane serves as the actuation element and it is provided with a piezoelectric material, thus it can be moved by applying a voltage. In order to open one of the fluid paths, the piezoelectric membrane has to be lifted against a spring working in the closing direction. The expansion caused by the change in length of the piezoelectric material generates the necessary opening force, energy being used during the transition from the closed to the open position. In the open position, the voltage at the piezoelectric membrane has merely to be maintained to keep it open. Now the actuating drive serves as a holding device and does not have to generate energy except for the minor holding energy. If the fluid path is to be closed again, is sufficient to switch off the holding voltage, so that the membrane follows the force of the spring and is moved back into its closing position.

In the known valve arrangement it is a disadvantage that the piezoelectric element can be overcome or hold strong forces, but that the regulating distances can only be executed in limited measures and reverse. As changes in the length by means of piezoelectric ceramics and the simultaneous development of strong force can only be effected in the per mil range, an extension of the distance has for example to be effected by means of a lever transfer apparatus. Herein, however, the transferrable force is decreased correspondingly. Strong fluid flows with correspondingly high pressure can therefore not be switched with the known valve arrangement.

SUMMARY OF THE INVENTION

The present invention provides a valve arrangement so that even with large valve strokes allowing for strong fluid flows a strong force can be applied to the actuation element An advantage of the invention is that the actuating drive for the actuation element can be optimized with regard to covering long distances, the holding device being calibrated so that it can resist large forces against high fluid pressures.

Such microstructured valve arrangements can be manufactured in various ways: a known way is the etching of the structure into a basic silicon body; another known process uses X-ray lithography, electroforming and molding for the manufacturing of microstructures. In Germany this process is known as "LIGA-process".

An especially favorable embodiment is manufactured when the flow path distributor is etched into a basic silicon body and has channels, in which at least one of its channel openings is closable by a closing element in the shape of an actuation element Such an embodiment allows for many options in the design and execution of the various construction elements or components and for the use of a multitude of embodiments for the actuation drive and the holding device.

Preferably the closing element is a membrane clamped in the basic body on all sides, the membrane having openings in areas which are in danger of developing tension cracks due to stroke movements. In a rectangular membrane these are the corner areas.

Instead of a membrane clamped on all sides a tongue clamped on one side can be used, as the problem of areas endangered by tension cracks does not occur in such a freely swinging arrangement.

For the stabilization of the area of the closing element covering the channel opening, this area is provided with a thickening.

Advantageously, the actuating drive comprises a coating of piezoelectric material which is applied to the closing element and which can be connected to an electrical power source. The holding device can be a condenser holder. By applying a voltage a charge transfer to the piezoelectric coating takes place which bends the membrane toward the channel opening and closes it. The membrane has a coating of conductive material to which a voltage is applied with regard to the conductive basic silicon body when the channel opening is closed and by means of which the membrane is kept or held on the channel opening. Finally, the actuating drive can be switched off.

In order to generate a sufficient holding force, with the distances that have to be covered in microstructured valve arrangements, a voltage difference of 1 volt to 30 volts at the condenser plates is sufficient. These ranges are usual for the voltage supply required in microelectronics.

In a further advantageous embodiment, the flow path distributor and the respective fluid paths are covered by a membrane carrying a thin-layered, possibly spiral-shaped conductor path being applied on one of the membrane surfaces in the proximity of the channel opening to be closed. The area of the conductor path is exposed to a magnetic field with diverging lines of force. If current is sent through the conductor path, a magnetic dipole is generated due to the circular current which is pulled into the lines of force or pushed away, depending on its position relative to the magnetic field The position of the dipole is determined by the direction of the current in the conductor path. By a respective switching, the membrane can be positioned onto the channel opening or be lifted off due to the change of the direction of the current.

The required magnetic field can be generated by the arrangement of one permanent magnet on either side of the membrane, their poles facing one another. In closed position, the membrane is held by means of a condenser holder, which generates the holding force when a voltage is applied to the respective condenser plates. The current going through the conductor path can now be switched off. Such embodiments are easy to manufacture, as the basic silicon body, the membrane, the conductor path and the condenser plates can all be machined from one multi-layered unit of a single basic body by means of etching or according to the "LIGA" process. This allows for a compact and clear embodiment which can be realized depending on the requirements for the channel arrangement.

A further advantageous option for a valve arrangement is to provide a heating device as an actuating drive, which is arranged on the free surface of a membrane etched from silicon. On its surface facing the channel opening the membrane carries a closing element. The heating device has two different heating paths, one of which is arranged in the border area of the closing element and the other one is arranged in the border area of the connection between the membrane and the flow path distributor.

A silicon oxide membrane etched free from a basic silicon body is under an internal pressure tension allowing the membrane to assume two stable positions: these are the bucklings or indentation P of the membrane in the direction of its two surfaces. On the transfer lines between the membrane and the closing element formed by a membrane thickening and also the transfer lines between the membrane and the basic silicon body. Thermal changes result in the transfer from one buckling to the other, both of which have to be regarded as stable switch positions of the actuation element for the valve arrangement and they therefore work as holding devices. The heating of the border area between the membrane and the closing element results in the buckling of the membrane from the open into the closed position, the membrane remaining closed even when the respective heating is switched off. To open the closing element again, all that is required is to switch on the heating in the border area to the basic silicon body, and the membrane returns into the stable opening position. Thus a total stroke of about 40 micrometers can be achieved at a membrane length of about 500 micrometers.

In a further embodiment of the invention, the actuating drive comprises at least two layers of different thermal expansion coefficients. One of the layers can be the membrane working as a closing element made for example from silicon nitride, the other can be an additional silicon oxide coating on the membrane. Thus a kind of "bimetal" effect of the two layers occurs, when they are heated by a heating device. Again, the holding device is a condenser.

The meander-shaped paths of the heater applied to the membrane can be used instead of an additional layer. The webs of the heater, which are long relative to their distance to one another, let the membrane buckle when they expand due to the heating current. But even a homogeneous membrane by itself can be made to deform bimetal-like by means of a unilateral heating, which is the result of an extremely brief and intensive heating. In order to reduce the tensile force resulting from the buckling, the membrane can be made from a mixture of silicon oxide and silicon nitride.

In order to create a valve arrangement where the actuating drive can travel especially long distances, a slider is provided, which can be swivelled over the channel opening and actuated by means of an actuation device. Between the actuation device and the slider a level transfer is provided, which transfers the relatively small path of the actuation to the larger path of the slider required. By means of the level transfer, however, the power force transfer is reduced. Therefore, an electrostatically working condenser holding device is provided for the closing of the channel opening. For this purpose, the channel opening is surrounded by an area of conductive material and the slider itself is made from conductive material. As soon as the slider is positioned over the channel opening, a voltage is applied to the condenser plates, so that the slider touches the channel opening and closes it. Then the actuation can be switched off. For the actuation of the lever apparatus, a piezo drive or crystal drive is favorable, or a rod carrying a heating element and extending in length when heated up. An actuation condenser, one of whose condenser plates is fixedly connected to the basic body and whose other condenser plate is fixedly connected to the lever apparatus is also advantageous. A change of the path is effected by applying a voltage to the plates facing one another.

Accordingly it is an object of the invention to provide a valve made of microstructured components which comprises a body which has a first face and an opposite second face, the first face having a recess defining a pumping chamber with a channel defined in the body from the recess to the second face and which also includes an actuation membrane covering the recess and comprising a dielectric which has an exterior with a coating, an interior side facing the body defining two condenser plates, coating on the interior side having a material with a coefficient of thermal expansion being different from the membrane which also includes a plurality of electrical heating elements arranged on the actuation membrane and defining an actuating drive.

A further object of the invention is to provide a valve made of microstructured components which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
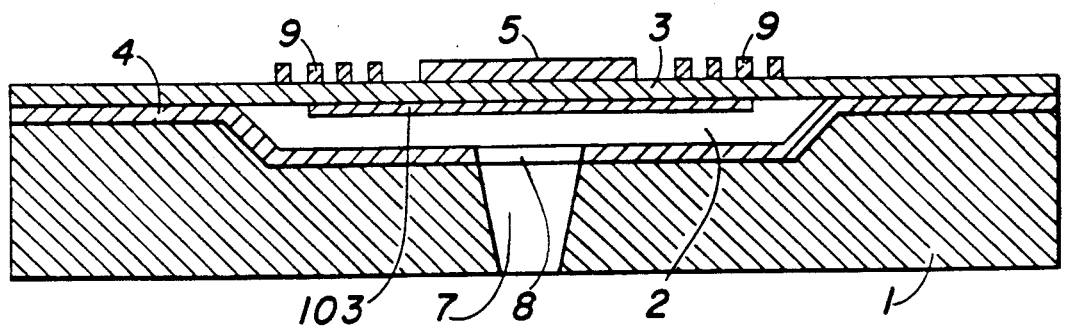
FIG. 1 is a section through a valve arrangement with a membrane and an additional coating constructed in accordance with the invention.

Referring to the drawings in particular, the invention embodied therein as shown in FIG. 1 comprises a valve made of microstructured components which comprises a valve body 1 having a first face with a recess defining a pumping chamber or channel 2, an opposite second face into which a channel 7 opens from the channel 2. In accordance with the invention the construction includes an actuation member or actuation membrane 3 covering the recess 2 which provides a holder. The membrane has a dielectric 103 having an exterior with a coating and has an opposite interior side facing the body which together with the body defines two condenser plates. A coating over the interior side of the actuation element 3 has a coefficient of thermal expansion which is different from the membrane 3. A plurality of electrical heating elements 9 are arranged on the actuation membrane 3 and they define an actuation drive.

FIG. 1 shows a valve arrangement with microstructured components which are etched from silicon, and with a basic body serving as a flow path distributor. The body has first and second opposite faces, the first face having etched channels 2 and whose channel opening 8 is covered by a membrane 3 serving as an actuation element. The channel 2 has a lining 4 e.g. of silicon oxide or silicon nitride. It serves as a dielectric for two condenser plates 1 and 5, one of which is the basic body 1 and the other one is a coating applied onto the membrane 3. The condenser plates provide a holding force maintaining the membrane 3 in a closing portion over opening 8. On the membrane as a first layer a second layer 103 is applied, comprising a material having a coefficient of thermal expansion different from the membrane 3 providing a bimodal arrangement such that layers 103 and membrane 3 seal opening 8. A series of heating elements 9 is arranged on the membrane on both sides or ends of the condenser plate 5. The heating of the bimodal arrangement provides a bimodal deformation. The heating elements 9 can be connected by means of connection contacts (not shown) to an electrical power source (not shown). Connection contacts for the condenser 1, 5 to an electrical power source (not shown) are also provided.

Figure 2:
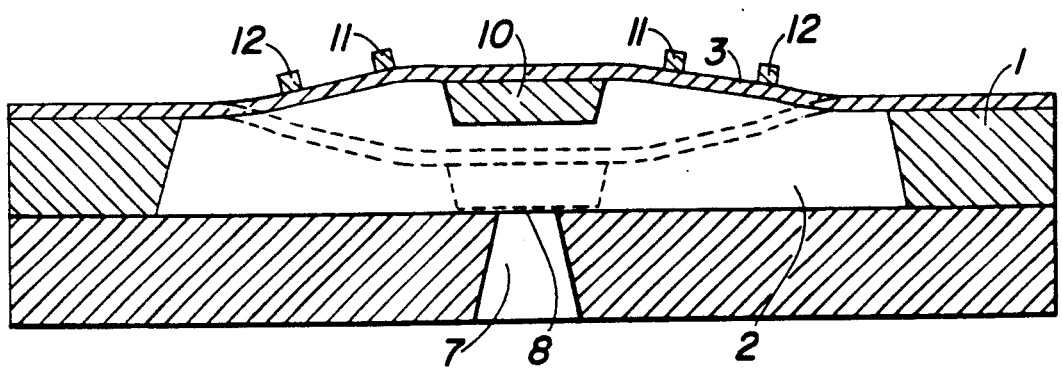
FIG. 2 is a similar section of another embodiment of the valve with a buckling membrane.

As shown in FIG. 2, the silicon basic body 1 has an actuation member or membrane 3 covering the channel 2, 7 and carrying a closing element 10 in the area above the channel opening 8, which is lifted off the opening 8 as the membrane 3 bulges outwardly. On the surface of the membrane 3 averted from the opening 8 two heating strips 11, 12 are provided, each of which is independently heatable. One heating strip 11 is arranged near the bending zone in the border area of the membrane 3 and the closing element 10, the other heating strip 12 is arranged near the bending zone in the border area between the membrane 3 and the basic body 1. In order to move the membrane 3 into the closed position represented in broken line, the heating strip 11 is to be heated, so that a buckling tension is generated, which presses the membrane 3 and therefore the closing element 10 onto the opening 8 in the area of the channel 2. Once the closed position (broken line) is achieved, it remains stable, even if the heating strip is switched off. In order to open the membrane again, the heating strip 12 has to be switched on and the generated bucking tension leads to a rebounding of the membrane 3 over the channel 2 into the original stable opening position. Consequently the heating strip 12 can be switched off again.

Figure 3:
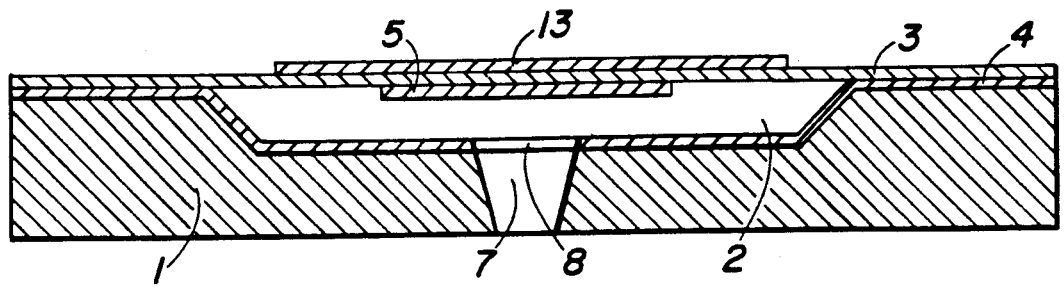
FIG. 3 is a similar section of another embodiment of a valve with a membrane and a piezo actuation (crystal drive)

In FIG. 3 the membrane 3 has a piezoelectric layer which serves as a piezo actuation (crystal drive) for the actuating drive means of the actuation member or membrane 3. On the surface of the membrane 3 facing the channel 2 the condenser plate 5 is arranged, whose counterpart is the basic body 1. For the operation, voltage is applied to the piezoelectric layer 13 which then buckles the membrane 3 in the area of the channel 2 and bends it into the direction of the channel opening 8. When the membrane 3 or the condenser plate 5 lies on the channel opening a voltage is applied to the condenser and thus the membrane 3 is kept closed, even when the electrical power supply for the piezo actuation 13 is switched off.

Figure 4:
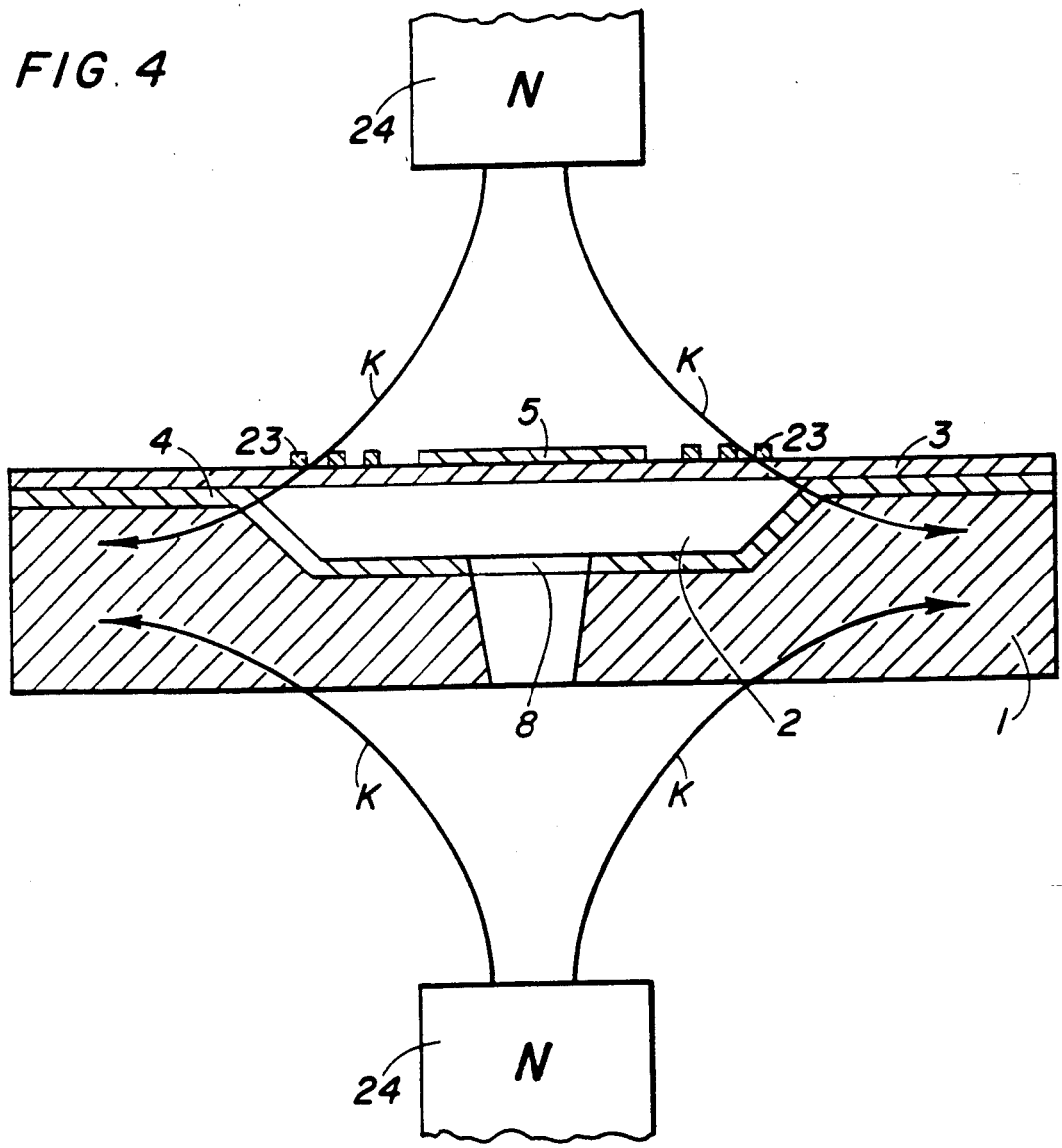
FIG. 4 is a similar section of another embodiment of a valve with spiral-shaped flow conductor paths exposed to a magnetic field.

FIG. 4 shows a valve arrangement having spiral-shaped flow conductor paths 23 on the actuation member or membrane 3 which are exposed to a magnetic field with diverging lines of force K. The magnetic field is generated by means of the two poles N of two permanent magnets 24, which are arranged on both sides of the conductor paths 23.

Figure 5:
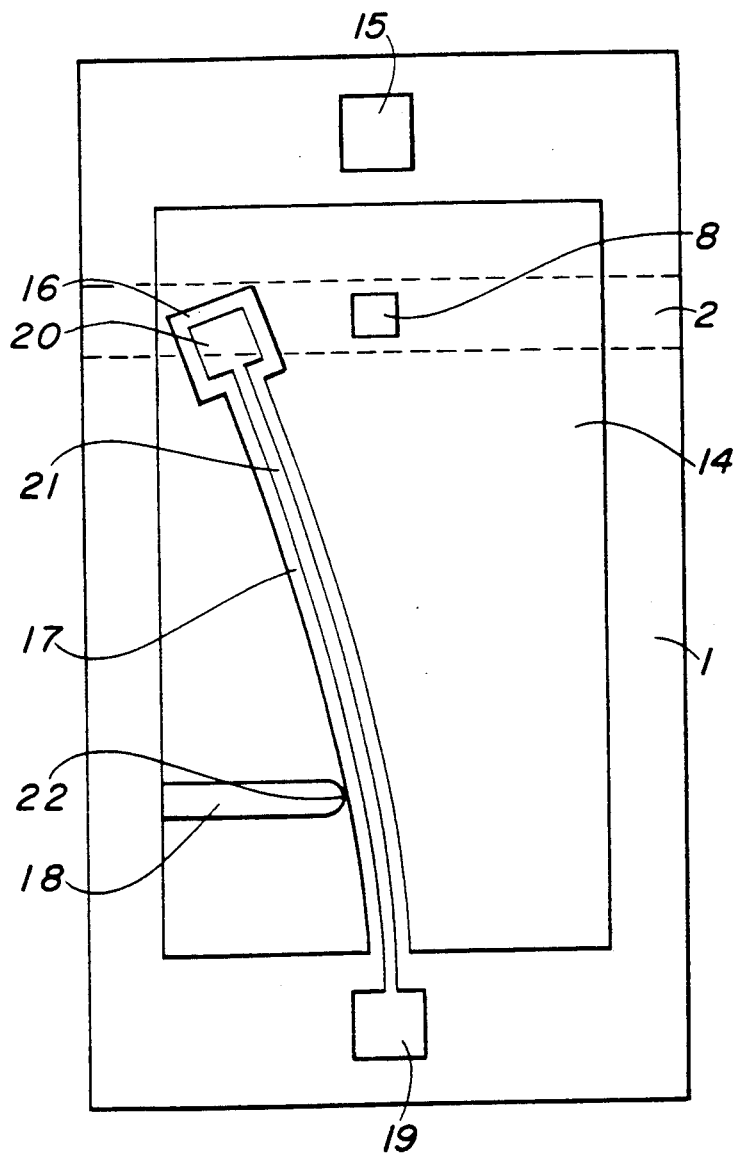
FIG. 5 is a top plan view of another embodiment of a valve with a swivelable slider.

The valve arrangement in FIG. 5 is also provided with a basic body 1 made from silicon, in which the channel 2 (shown in broken line on the bottom of basic body 1 and the channel opening 8 are let in, the channel opening penetrating the surface of the basic body 1 starting from the channel 2. The conductive basic body 1 can be connected to a voltage source (not shown) by means of a contact 15. An actuation member including a slider 16 is connected to a longitudinal drive 18 made from piezoelectric material by means of its arm 17. The slider 16 consists of an electrically insulated material and carries an electrically conductive layer 20, which is connected to a connection contact 19 by means of an electrical flow path 21. For the actuation of the valve arrangement the slider 16 is moved onto the level of the channel opening 8 by means of the longitudinal drive 18 and kept in this position. As soon as the slider has reached this position, a voltage is applied to the contacts 15 and 19, so that the slider 16 sits tightly on the channel opening 8 and closes it. Now the longitudinal drive 18 can be switched off. In the embodiment according to the drawings, the arm 17 is bent so that the slider 16 opens the channel opening 18 in the resting position The longitudinal drive 18 having contact with the arm 17 pushes the slider 16 over the channel opening with its averted end 22 in a switching position.

The longitudinal drive 18, the arm 17 with the respective slider 16, the layer 209 and the flow path 21 are worked out of the basic body 1 in the area 14.

While specific embodiments of the invention have been shown and described in detail to illustrate the application of the principles of the invention, it will be understood that the invention may be embodied otherwise without departing from such principles.

What is claimed is:

1. A microstructured valve arrangement, comprising: a basic body structure defining a flow path having an opening; an actuation member connected to said basic body structure so as to be supported in a rest position, spaced away from said opening, and supported in an extended position, disposed over said opening; actuating drive means connected to said actuation member for moving said actuation member from said rest position to said extended position; and, holding means independent of said actuation drive means for retaining said actuation member in said extended position, said actuating drive means comprising a piezo actuation crystal drive element including a piezo electric element acting on said actuation member.

2. A valve arrangement for the control of fluids constructed of microstructured components, comprising a basic body having a flow path, an actuation element movable relative to said flow path and opening and closing said flow path depending on it position, said actuation element being in the form of a membrane, actuating drive means for effecting a transition from a first position into another position comprising an actuating drive connected to an electrical power source and to said actuation element for moving said actuation element between a switch on and a switch off position, said actuating drive operating according to a first operating principle aiming at covering the longest distance possible, and a holding device formed by said basic body and a condenser plate on said basic body providing for holding said membrane which works according to a second operating principle working independently of the first operating principle and aiming at the generation of the greatest cohesion possible the actuating drive comprising an element of piezoelectric material acting on said closing element.

3. A valve made of microstructured components, comprising a body having a first face and an opposite second face, said first face having a recess defining a pumping chamber, a channel defined in said body leading from said recess providing a holder and comprising a dielectric having an exterior with a coating and having an opposite interior side facing said body together defining two condenser plates, a coating over said interior side of a material having a coefficient of thermal expansion different from said membrane, and a plurality of electrical heating elements arranged on said actuation membrane defining an actuation drive, wherein said membrane comprises a piezoelectric material and including a condenser plate underlying said membrane.

* * * * *